United States Patent
Bhan et al.

(10) Patent No.: US 8,243,656 B1
(45) Date of Patent: Aug. 14, 2012

(54) EFFICIENT ACCESS IDENTIFIER UTILIZATION IN WIRELESS ACCESS SYSTEMS

(75) Inventors: Ashish Bhan, Shawnee, KS (US); Sachin R. Vargantwar, Overland Park, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 383 days.

(21) Appl. No.: 12/686,471

(22) Filed: Jan. 13, 2010

(51) Int. Cl.
*H04W 7/216* (2006.01)
(52) U.S. Cl. ....................................... 370/328
(58) Field of Classification Search .............. 370/328, 370/329, 312, 390, 335, 342–348, 441, 419, 370/420, 338; 455/161.3, 343.3
See application file for complete search history.

(56) References Cited

U.S. PATENT DOCUMENTS

| | | | |
|---|---|---|---|
| 6,856,604 B2 * | 2/2005 | Lundby | 370/312 |
| 7,016,323 B2 | 3/2006 | Yun et al. | |
| 8,077,689 B1 * | 12/2011 | Jones et al. | 370/338 |
| 2008/0070576 A1 | 3/2008 | Sanders et al. | |

* cited by examiner

*Primary Examiner* — Chi Pham
*Assistant Examiner* — Alexander Boakye (57) ABSTRACT

What is disclosed is a wireless access system. The wireless access system includes a wireless access control system configured to maintain an available pool of Media Access Control Identifiers (MAC IDs) for subsequent use by a base station, remove a portion of the MAC IDs from the available pool, and use the portion of the MAC IDs for wireless communications between a wireless transceiver of the base station and a plurality of user devices. The wireless access control system is configured to determine that the available pool of the MAC IDs is insufficient, and in response, select a set of the user devices based on at least wireless signal strength. The wireless transceiver of the base station is configured to instruct the selected set of the user devices to not use the base station for the wireless communication, and in response, the wireless access control system is configured to return ones of the MAC IDs used by the selected set of the user devices to the available pool.

20 Claims, 6 Drawing Sheets

EFFICIENT ACCESS IDENTIFIER UTILIZATION IN WIRELESS ACCESS SYSTEMS

TECHNICAL FIELD

Aspects of the disclosure are related to the field of communications, and in particular, access identifier utilization in wireless systems of wireless communication networks.

TECHNICAL BACKGROUND

Wireless communication systems typically include wireless access nodes, such as base stations, which provide wireless access to communication services for user devices over wireless links. A typical wireless communication system includes many wireless access nodes to provide wireless access across a geographic region, with individual wireless coverage areas associated with each wireless access node. The wireless access nodes exchange user communications and overhead communications through a core network or via control nodes of the wireless communication system. The control nodes typically coordinate handoffs of user devices moving between coverage areas of different wireless access nodes, control the operation of the wireless access nodes, and route communications, among other functions.

To provide wireless access to communication services for user devices, a wireless access node provides an access identifier to a user device. This access identifier can be used to identify the communications of a user device when accessing communication services through the wireless access node, for example. However, in typical wireless communication systems, a limited number of access identifiers are available for user devices at a particular wireless access node, which when exhausted, may prevent other user devices from establishing wireless access or communication sessions.

OVERVIEW

What is disclosed is a wireless access system. The wireless access system includes a wireless access control system configured to maintain an available pool of Media Access Control Identifiers (MAC IDs) for subsequent use by a base station, remove a portion of the MAC IDs from the available pool, and use the portion of the MAC IDs for wireless communications between a wireless transceiver of the base station and a plurality of user devices. The wireless access control system is configured to determine that the available pool of the MAC IDs is insufficient, and in response, select a set of the user devices based on at least wireless signal strength. The wireless transceiver of the base station is configured to instruct the selected set of the user devices to not use the base station for the wireless communications, and in response, the wireless access control system is configured to return ones of the MAC IDs used by the selected set of the user devices to the available pool.

What is also disclosed is a method of operating a wireless access system. The method includes, in the wireless access system, maintaining an available pool of Media Access Control Identifiers (MAC IDs) for subsequent use by a base station, and removing a portion of the MAC IDs from the available pool and using the portion of the MAC IDs for wireless communications between the base station and a plurality of user devices. The method also includes, in the wireless access system, determining that the available pool of the MAC IDs is insufficient, and in response, selecting a set of the user devices based on at least wireless signal strength, instructing the selected set of the user devices to not use the base station for the wireless communications, and returning ones of the MAC IDs used by the selected set of the user devices to the available pool.

What is also disclosed is a method of operating a wireless access system. The method includes, in the wireless access system, selecting Media Access Control Identifiers (MAC IDs) for subsequent use by a base station, using the selected MAC IDs for a forward link portion of wireless communications between the base station and a plurality of user devices, and restricting the selected MAC IDs from subsequent use by other user devices. The method also includes, in the wireless access system, determining that an amount of unrestricted MAC IDs is insufficient, and in response, selecting a set of the user devices currently in a soft handoff mode with at least the base station and another base station, transferring a data rate control (DRC) lock instruction to the selected set of the user devices, where the DRC lock instruction indicates no bandwidth is available for the forward link portion of the wireless communications between the base station and the selected set of the user devices. The method also includes, in the wireless access system, releasing ones of the MAC IDs used by the selected set of the user devices for subsequent use by the other user devices.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
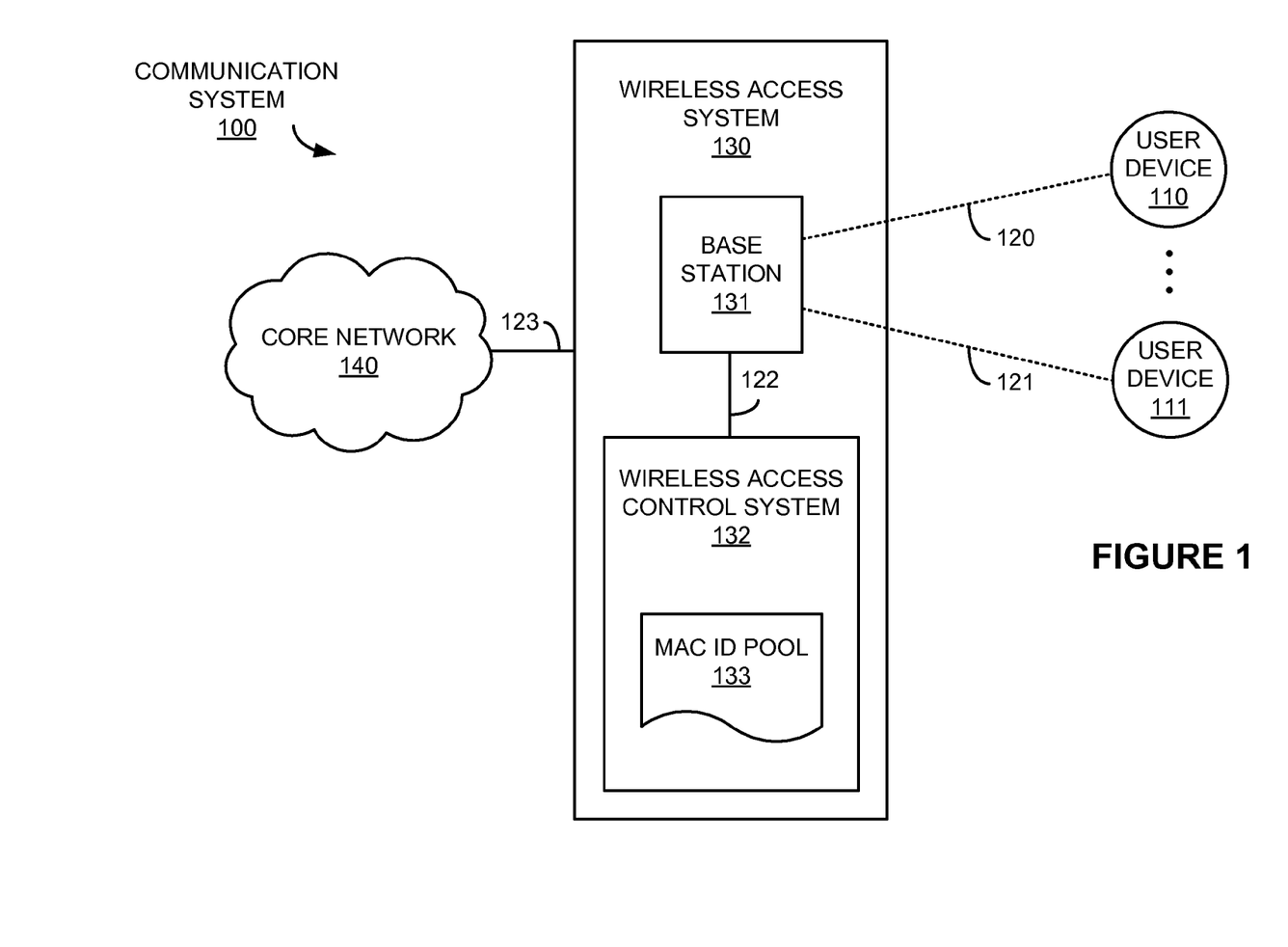
FIG. 1 is a system diagram illustrating a communication system.

FIG. 1 is a system diagram illustrating communication system 100. Communication system 100 includes user devices 110-111, wireless access system 130, and core network 140. User devices 110-111 each communicate with wireless access system 130 over wireless links 120-121, respectively. Core network 140 and wireless access system 130 communicate over link 123. Wireless access system 130 includes base station 131 and wireless access control system 132. Base station 131 and wireless access control system 132 communicate over link 122. In this example, user device 110 and base station 131 of wireless access system 130 communicate over wireless link 120, and user device 111 and base station 131 communicate over wireless link 121. In some examples, core network 140 and wireless access control system 132 of wireless access system 130 communicate over link 123, although other configurations could be employed. Wireless access control system includes Media Access Control Identifier (MAC ID) pool 133. Although two user devices are shown in FIG. 1, it should be understood that a different number of user devices could be in communication with wireless access system 130, or base station 131. Additionally, although base station 131 and wireless access control system 132 are shown as separate entities in wireless access system 130, base station 131 could include the equipment or functionality of wireless access control system 132 in other examples.

In FIG. 1, user devices 110-111 register for wireless access through base station 131 over wireless link 120-121, respectively. As a part of the registration process, or during a subsequent request for communication services, base station 131 provides at least one MAC ID to each of user devices 110-111. These MAC IDs could be used to identify communications transferred by user devices 110-111, or used in apportioning bandwidth of wireless links 120-121 to user devices 110-111, among other uses. In other examples, other identifiers than the MAC ID could be employed in the wireless communications.

Figure 2:
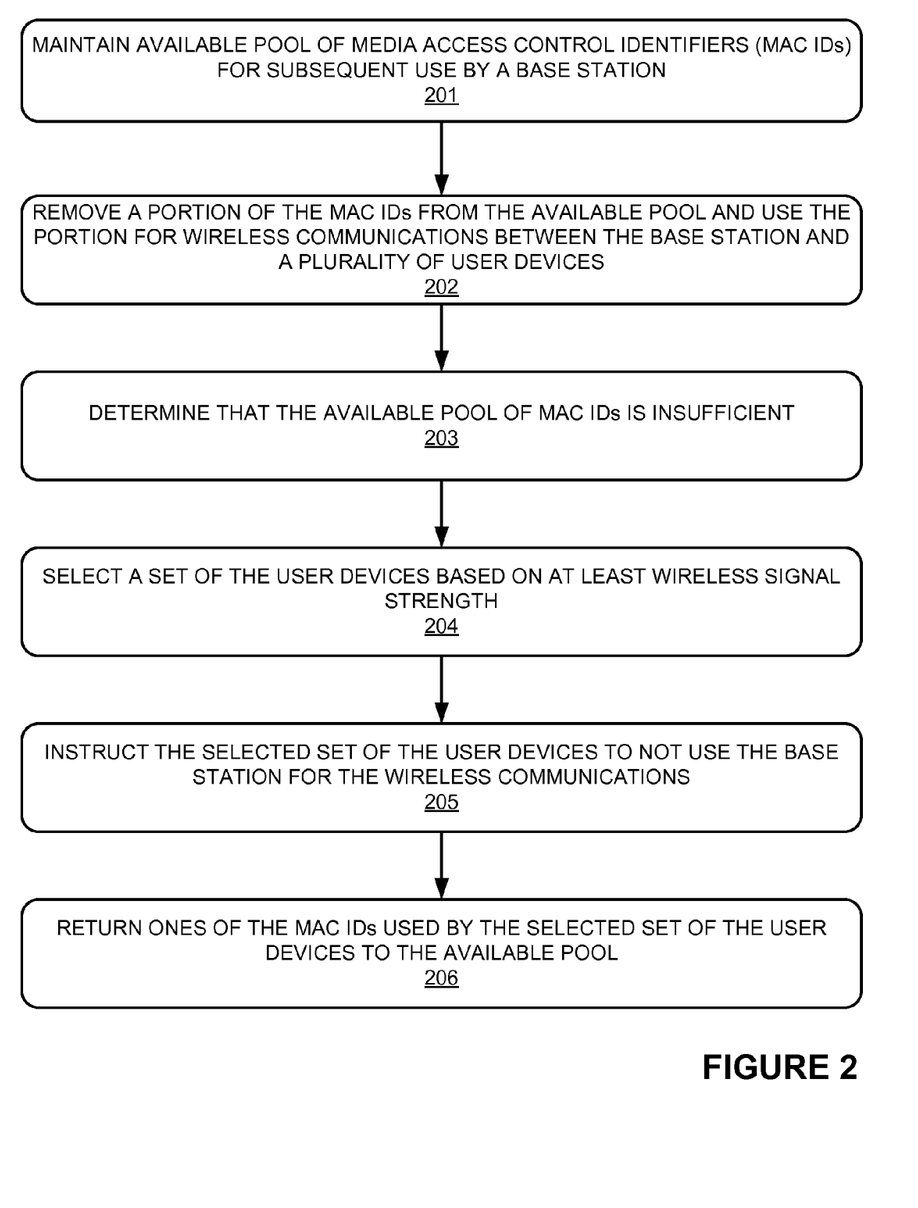
FIG. 2 is a flow diagram illustrating a method of operation of a communication system.

FIG. 2 is a flow diagram illustrating a method of operation of communication system 100. The operations in FIG. 2 are referenced herein parenthetically. In FIG. 2, wireless access control system 132 maintains (201) available pool 133 of media access control identifiers (MAC IDs) for subsequent user by base station 131. Wireless access control system 132 removes (202) a portion of the MAC IDs from available pool 133 and uses the portion for wireless communications between base station 131 and user devices 110-111. In this example, the wireless communications are exchanged between base station 131 and user devices 110-111 over wireless links 120-121, respectively. Further wireless communications can be exchanged between base station 131 and user devices 110-111, such as user communications, overhead communications, or other communications and wireless signaling.

Wireless access control system 132 then determines (203) that available pool 133 of MAC IDs is insufficient. For example, the remaining MAC IDs in available pool 133 may be of a quantity that prevents additional communication sessions or new user devices from receiving wireless access through base station 131. In other examples, available pool 133 of MAC IDs may be of a MAC ID type which is insufficient for a desired communication type, or a particular level of service for new user devices. In response to determining that available pool 133 of MAC IDs is insufficient, wireless access control system 132 selects (204) a set of the user devices based on at least wireless signal strength. For example, wireless access control system 132 could select user device 110 based on a signal strength, and the signal strength could indicate a signal strength of communications transferred by base station 131 over wireless link 120. In other examples, the signal strength could indicate a signal strength of communications detected by user device 110 from another base station (not pictured in FIG. 1). It should be understood than other user devices could be included in FIG. 1, and a set of selected user devices could include any combination thereof.

Wireless access control system 132 instructs (205) the selected set of the user devices to not use base station 131 for the wireless communications. In some examples, the instruction could be issued over an overhead portion of a wireless link, such as over wireless link 120 to user device 110. The overhead portion could include a messaging portion, a paging portion, control channel, a date rate control (DRC) lock channel or portion, among other portions, channels, frequencies, or timeslots. In response to the instruction, wireless link could be terminated, or user communication traffic halted thereon while continuing overhead communication traffic. Wireless access control system 132 then returns (206) ones of the MAC IDs used by the selected set of the user devices to available pool 133. The MAC IDs returned to active pool 133 could then be used for other user devices or communication sessions with existing user devices. The user devices which are not part of the selected set of user devices would typically continue with any existing communication session or continue to receive wireless access through base station 131.

Figure 3:
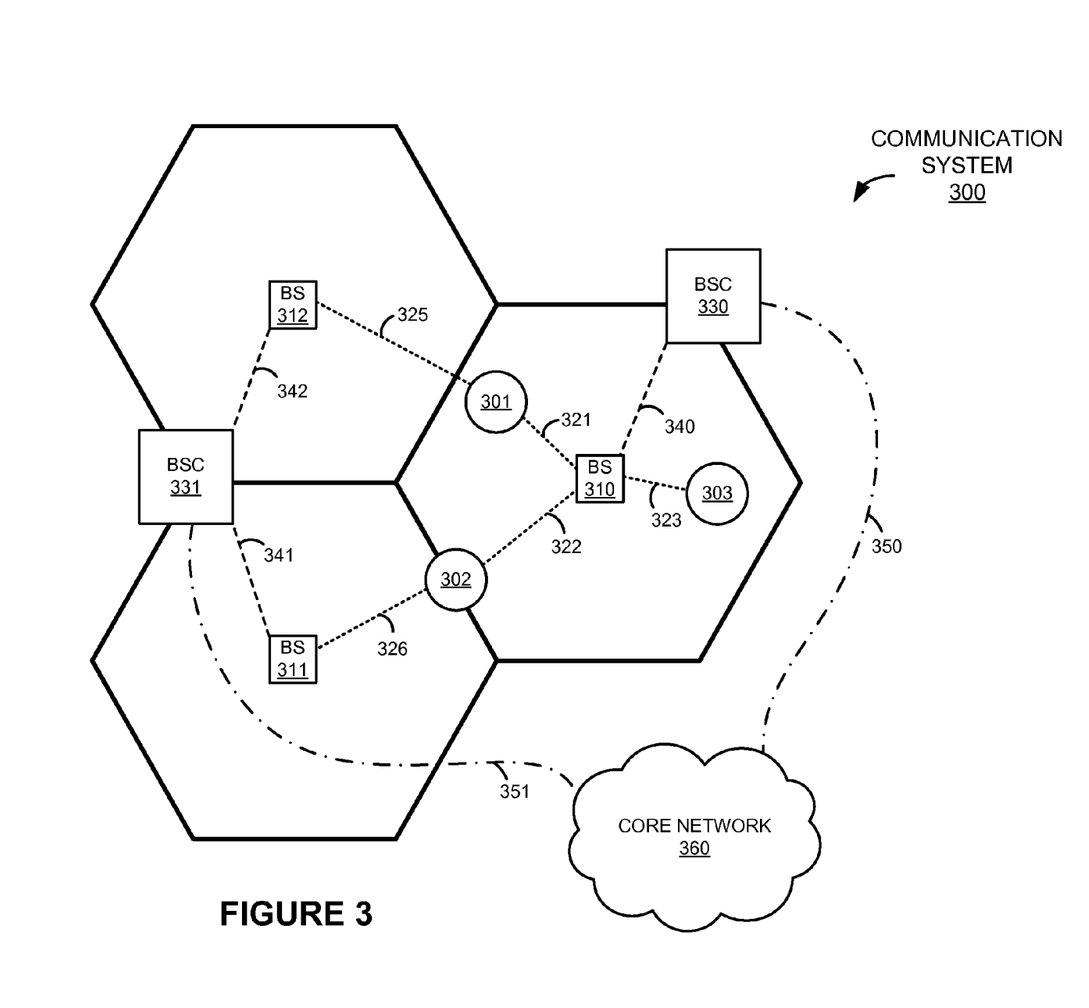
FIG. 3 is a system diagram illustrating a communication system.

FIG. 3 is a system diagram illustrating communication system 300. Communication system 300 includes user devices 301-303, base stations (BS) 310-312, base station controllers (BSC) 330-331, and core network 360. Base stations 310-312 each communicate individually with an associated base station controller 330-331 over backhaul links 340-342, respectively. In this example, links 340-342 are T1 links. Base station controllers 330-331 and core network 360 communicate over links 350-351, respectively. In this example, links 350-351 are optical networking links capable of carrying Internet protocol (IP) packets. Also in this example, user devices 301-303 are each mobile smartphones and can communicate over wireless links to any of base stations 310-312, depending upon the present location of each user device, among other factors. User devices 301-303 each communicate using the Evolution-Data Optimized (EV-DO) wireless protocol, although other wireless protocols could be employed.

Base stations (BS) 310-312 could each include RF communication and control circuitry and antennas, as well as wireless communications equipment capable of communicating with and providing communication service to user devices, among other equipment. In some examples, base stations 310-312 each include MAC ID pools, or processing equipment to determine MAC IDs. As shown in FIG. 3, each base station 310-312 has an associated hexagonal coverage area which represents a limited geographic range over which wireless access is provided to user devices. Although a hexagonal region defining the coverage areas is shown in FIG. 3, it should be understood that the coverage areas could be of other shapes and configurations, as determined by geographic features, empirical data, radio frequency (RF) conditions, the associated equipment, or by other factors, including combinations thereof. Each base station 310-312, or other base station equipment, in each of the coverage areas can provide wireless access for user devices that may be located within each associated coverage area. Each coverage area could include further user devices and wireless access systems. Base station controllers (BSC) 330-331 each include equipment such as communication interfaces and processing systems for communicating with and controlling the associated base stations 310-312. In some examples, BSC 330-331 each include MAC ID pools, or processing equipment to determine MAC IDs. BSC 330-331 could also include communication equipment capable of routing communications exchanged between the associated base stations 310-312 and core network 360 to further systems and networks. In this example, base stations 310-312 are operated by the same wireless service provider as BSC 330-331. Core network 360 is a core network of a wireless access system in this example. Core network 360 could include further base stations, routers, gateways, controller systems, processing systems, access systems, or other communication equipment.

Figure 4:
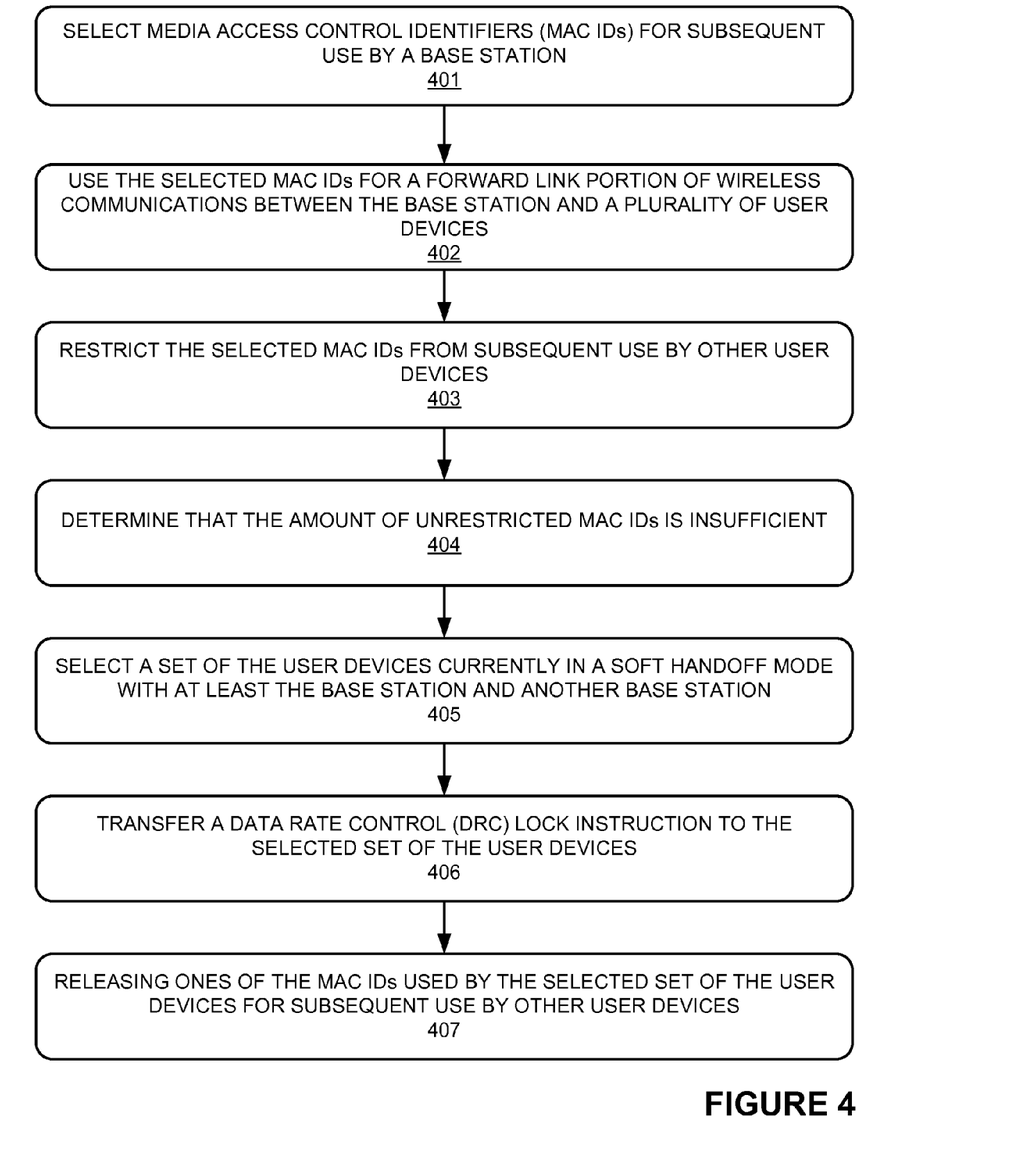
FIG. 4 is a flow diagram illustrating a method of operation of a communication system.

FIG. 4 is a flow diagram illustrating a method of operation of communication system 300. The operations of FIG. 4 are referenced herein parenthetically. In FIG. 4, base station controller (BSC) 330 selects (401) media access control identifiers (MAC IDs) for subsequent use by base station (BS) 310. In this example, the MAC IDs are used to identify portions of a wireless link for use by a particular user device or particular communication session of a user device. The MAC IDs could comprise numerical identifiers, timeslot identifiers, Walsh codes, frequency identifiers, channel identifiers, or other identifiers. BSC 330 identifies the MAC IDs for base station 310 or transfers the MAC IDs to base station 310 for use by base station 310. Base station 310 uses (402) the selected MAC IDs for a forward link portion of wireless communications between base station 310 and a plurality of user devices. In the example shown in FIG. 3, BS 310 uses the at least a portion of the selected MAC IDs for wireless communications with each of user devices 301-303. Each of wireless links 321-323 could include forward link portions for communications transferred by base station 310, and reverse link portions for communications transferred by an associated user device. In some examples, portions of the forward link or reverse links are shared by all user devices receiving wireless access through base station 310. After the MAC IDs are selected for use by base station 310, base station controller 330 or base station 310 restricts (403) the selected MAC IDs from subsequent use by other user devices. These other user devices could be new user devices, not pictured in FIG. 3, seeking wireless access through base station 310.

Base station controller 330 or base station 310 then determines (404) that the amount of unrestricted MAC IDs is insufficient. For example, the unrestricted MAC IDs may be of an amount that prevents additional communication sessions or new user devices from receiving wireless access through base station 310. In other examples, the unrestricted MAC IDs may be of a MAC ID type which is insufficient for a desired communication type, or a particular level of service for new user devices. In response to determining that the amount of unrestricted MAC IDs is insufficient, base station controller 330 or base station 310 selects (405) a set of the user devices currently in a soft handoff mode with at least base station 310 and another base station. In FIG. 3, user device 301 is shown in a soft handoff mode with both base station 310 and base station 312 over wireless links 321 and 325, respectively. Also, user device 302 is in a soft handoff mode with both base station 310 and base station 311 over wireless links 322 and 326, respectively. Since user devices 301-302 are in a soft handoff mode with base station 310 and another base station in the example shown in FIG. 3, any one of user devices 301-302 could be selected in operation 405. Also, since user device 303 is not in a soft handoff mode, user device 303 would not be selected in operation 405.

Although the term soft handoff mode is used herein, it should be understood that a soft handoff mode comprises a single user device in contact with or monitoring communications of more than one base station. This soft handoff mode could describe a virtual soft handoff mode where communications, such as pilot signals, are merely monitored from at least a second base station but wireless access has not been established through that second base station. The soft handoff mode could also describe where base stations, in addition to base station 310, are included in a neighbor list of base stations, which indicates base stations suitable for communication with a particular user device as determined by signal strength, RF conditions, distance, location, traffic loading, among other considerations. In yet further examples, the soft handoff mode could describe where additional base stations are included in an active list of a user device, where the user device having the active list with multiple base stations has established a certain level of wireless access from each of the multiple base stations, such as exchanging user or overhead communications over a forward link or reverse link portion of wireless links associated with each of the base stations in the active list.

Base station 310 then transmits (406) a data rate control (DRC) lock instruction to the selected set of user devices. As discussed in operation 405, user devices 301-302 are selected. Thus, base station 310 transmits a DRC lock instruction to user devices 301-302 over the associated wireless links. In the EV-DO protocol in use in FIG. 3, a forward link portion of a wireless link contains DRC lock instructions which indicate if a user device monitoring the DRC lock instructions has been allocated bandwidth, data time slots, or other data download allocations, for the forward link portion. In many examples, the bandwidth for the forward link portion is requested over a reverse link portion, such as a DRC channel of the reverse link. In this example, the DRC lock instructions are transferred for user devices 301-302 to indicate that no bandwidth is available for the forward link portion of the wireless communications between base station 310 and the selected user devices 301-302.

Base station controller 330 or base station 310 then releases (407) ones of the MAC IDs used by the selected user devices 301-302 for subsequent use by other user devices. In some examples, base station 310 indicates to base station controller 330 that selected user devices 301-302 have been notified via the DRC lock instructions, and base station controller 330 subsequently releases the associated MAC IDs back into a pool of available MAC IDs. In other examples, base station 310 maintains, selects, restricts, and releases the MAC IDs. In further examples, after user devices 301-302 have received the DRC lock instructions, or after being denied further communications from base station 310, user devices 301-302 could each establish wireless access through another base station. In examples where user devices 301-302 are in soft handoff mode with other base stations, user devices 301-302 would establish wireless access with another base station as indicated by the soft handoff mode, such as indicated by an active list, neighbor list, or virtual soft handoff. Since user device 301 is in a soft handoff mode with base station 312, user device 301 could establish wireless access over wireless link 325 and seek further communication services through base station 312. User device 301 could then drop or terminate wireless access with base station 310 over wireless link 321. Likewise, since user device 302 is in a soft handoff mode with base station 311, user device 302 could establish wireless access over wireless link 326 and seek further communication services through base station 311. User device 302 could then drop or terminate wireless access with base station 310 over wireless link 322.

In some examples, the selected set of user devices could be determined by a wireless signal strength, or a wireless signal strength and a soft handoff mode. The wireless signal strength could indicate a signal strength of communications received from base station 310 at each user devices. The user devices could each determine the signal strength of base station 310 and transfer an indicator of the signal strength to base station 310 or base station controller 330. In other examples, a signal strength of base station 310 and a signal strength of another base station could be determined by the user devices. The soft handoff mode could be determined to be user devices which indicate comparable signal strengths of base station 310 and of another base station. In some examples, user devices which detect comparable signal strengths from two base stations are considered located at an equal power boundary location. User devices in an equal power boundary location could be included in the selected set, such as in operation 405. In further examples, an application type of the communications of each user device is determined. For example, some user devices could be engaging in an application type which only uses bandwidth of a wireless link in a reverse direction. In many examples, a reverse link can be maintained at multiple base stations simultaneously by a user device, such as when in a soft handoff mode. When a selected user device that is engaging in a reverse-only application type is denied bandwidth via a DRC lock instruction, interruption to the communications would be minimized as the DRC lock affects forward communications in this example. A user device could then seek further wireless access from another base station, such as another base station in an active list, neighbor list, or virtual soft handoff.

It should be understood that BSC 331 and BS 311-312 could perform similarly to operations 401-407 for user devices in the respective coverage areas. Also, as discussed herein, the term media access control identifier could also refer to medium access control identifier.

Figure 5:
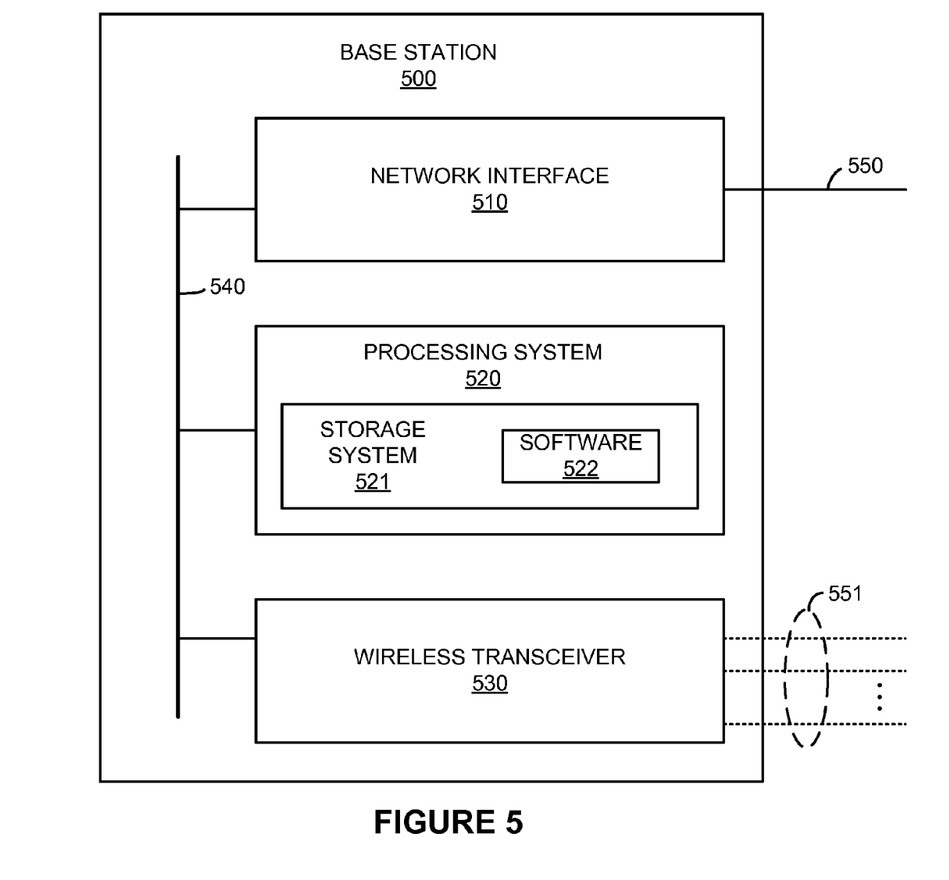
FIG. 5 is a block diagram illustrating a base station.

FIG. 5 is a block diagram illustrating base station 500, as an example of base station 131 found in FIG. 1 or base stations 310-312 found in FIG. 3, although base station 131 or base stations 310-312 could use other configurations. Base station 500 includes network interface 510, processing system 520, and wireless transceiver 530. Network interface 510, processing system 520, and wireless transceiver 530 communicate over bus 540. Base station 500 may be distributed among multiple devices that together form elements 510, 520-522, 530, 540, and 550-551.

Network interface 510 comprises network router and gateway equipment for communicating with a network of a wireless communication provider, such as with a wireless access system, core network, or a base station controller. Network interface 510 exchanges user communications and overhead communications with a base station controller or a core network of a wireless communication system, omitted for clarity, over link 550. Link 550 could use various protocols or communication formats as described herein for links 122-123 or 340-342, including combinations, variations, or improvements thereof.

Processing system 520 includes storage system 521. Processing system 520 retrieves and executes software 522 from storage system 521. In some examples, processing system 520 is located within the same equipment in which network interface 510 or wireless transceiver 530 are located. In further examples, processing system 520 comprises specialized circuitry, and software 522 or storage system 521 could be included in the specialized circuitry to operate processing system 520 as described herein. Storage system 521 could include a computer-readable medium such as a disk, tape, integrated circuit, server, or some other memory device, and also may be distributed among multiple memory devices. Software 522 may include an operating system, logs, utilities, drivers, networking software, and other software typically loaded onto a computer system. Software 522 could contain an application program, firmware, or some other form of computer-readable processing instructions. When executed by processing system 520, software 522 directs processing system 520 to operate as described herein, such as provide wireless access to user devices, route communications between user devices and a core network, receive MAC IDs or other access identifiers from a control system, as well as instruct user devices to no longer use base station 500 for wireless access. In further examples, processing system 520 maintains an available pool of MAC IDs, selects MAC IDs for use by user devices, and transfers the MAC IDs to the user devices for use in wireless access to communication services.

Wireless transceiver 530 comprises communication interfaces for communicating with user devices. Wireless transceiver 530 could include transceiver equipment and antenna elements for wirelessly exchanging user communications and overhead communications with user devices in a wireless communication system, omitted for clarity, over links 551. In some examples, two or more of links 551 are used to communicate with a single user device using different spreading codes or access identifiers. Wireless transceiver 530 also receives command and control information and instructions from processing system 520 or network interface 510 for controlling the operations of user devices over links 551, as well as for coordinating handoffs of user devices between other wireless access nodes or base stations. Links 551 could each use various protocols or communication formats as described herein for wireless links 120-121 or 321-323, including combinations, variations, or improvements thereof.

Bus 540 comprises a physical, logical, or virtual communication link, capable of communicating data, control signals, and communications, along with other information. In some examples, bus 540 is encapsulated within the elements of network interface 510, processing system 520, or wireless transceiver 530, and may be a software or logical link. In other examples, bus 540 uses various communication media, such as air, space, metal, optical fiber, or some other signal propagation path, including combinations thereof. Bus 540 could be a direct link or might include various equipment, intermediate components, systems, and networks.

Figure 6:
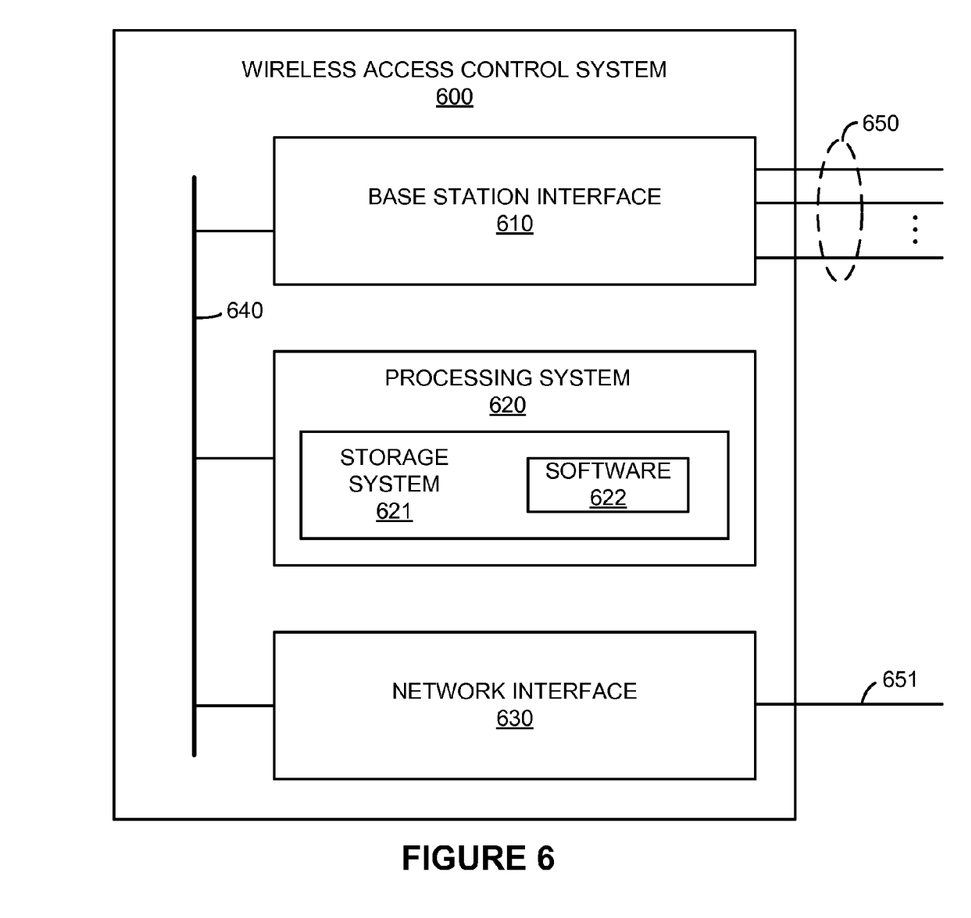
FIG. 6 is a block diagram illustrating a wireless access control system.

FIG. 6 is a block diagram illustrating wireless access control system 600, as an example of wireless access control system 132 found in FIG. 1 or base station controllers 330-331 found in FIG. 3, although wireless access control system 132 or base station controllers 330-331 could use other configurations. Wireless access control system 600 includes base station interface 610, processing system 620, and network interface 630. Base station interface 610, processing system 620, and network interface 630 communicate over bus 640. Wireless access control system 600 may be distributed among multiple devices that together form elements 610, 620-622, 630, 640, and 650-651.

Base station interface 610 comprises communication interfaces for communicating with and controlling the operations of base stations over links 650. Base station interface 610 also receives command and control information and instructions from processing system 620 or network interface 630 for controlling the operations of base stations over links 650, as well as for coordinating handoffs of user devices between other wireless access nodes or base stations. Links 650 could each use various protocols or communication formats as described herein for wireless links 122 or 340-342, including combinations, variations, or improvements thereof.

Processing system 620 includes storage system 621. Processing system 620 retrieves and executes software 622 from storage system 621. In some examples, processing system 620 is located within the same equipment in which base station interface 610 or network interface 630 are located. In further examples, processing system 620 comprises specialized circuitry, and software 622 or storage system 621 could be included in the specialized circuitry to operate processing system 620 as described herein. Storage system 621 could include a computer-readable medium such as a disk, tape, integrated circuit, server, or some other memory device, and also may be distributed among multiple memory devices. Software 622 may include an operating system, logs, utilities, drivers, networking software, and other software typically loaded onto a computer system. Software 622 could contain an application program, firmware, or some other form of computer-readable processing instructions. When executed by processing system 620, software 622 directs processing system 620 to operate as described herein, such as maintain an available pool of MAC IDs, select MAC IDs for use by base stations or user devices, determine that an available pool of MAC IDs are insufficient, process signal strengths of user devices, select user devices to not use a base station, and return MAC IDs to an available pool.

Network interface 630 comprises network router and gateway equipment for communicating with a core network of a wireless communication provider, such as with core network 140 or core network 360. Network interface 630 exchanges user communications and overhead communications with a core network of a wireless communication system over link 651. Link 651 could use various protocols or communication formats as described herein for links 123 or 350-351, including combinations, variations, or improvements thereof.

Bus 640 comprises a physical, logical, or virtual communication link, capable of communicating data, control signals, and communications, along with other information. In some examples, bus 640 is encapsulated within the elements of base station interface 610, processing system 620, or network interface 630, and may be a software or logical link. In other examples, bus 640 uses various communication media, such as air, space, metal, optical fiber, or some other signal propagation path, including combinations thereof. Bus 640 could be a direct link or might include various equipment, intermediate components, systems, and networks.

Referring back to FIG. 1, user devices 110-111 each comprise radio frequency (RF) communication circuitry and antenna elements. The RF communication circuitry typically includes amplifiers, filters, modulators, and signal processing circuitry. In many examples, user devices 110-111 each include circuitry and equipment to exchange communications of multiple wireless communication services over multiple wireless links, or with multiple base stations. User devices 110-111 may each also include user interface systems, memory devices, computer-readable storage mediums, software, processing circuitry, or some other communication components. User devices 110-111 each may be a wireless communication device, subscriber equipment, customer equipment, access terminal, telephone, mobile wireless telephone, computer, e-book, mobile Internet appliance, wireless network interface card, media player, game console, or some other wireless communication apparatus, including combinations thereof.

Wireless access system 130 includes base station 131 and wireless access control system 132. Base station 131 comprises RF communication and control circuitry, antenna elements, and communication routing equipment and systems. The RF communication circuitry typically includes amplifiers, filters, RF modulators, and signal processing circuitry. In many examples, base station 131 includes equipment to provide wireless access and communication services to user devices 110-111, and route communications between wireless access control system 132 and user devices 110-111. Base station 131 may also comprise routers, servers, memory devices, software, processing circuitry, cabling, network communication interfaces, physical structural supports, or other communication apparatuses. Wireless access control system 132 comprises processing equipment for handling MAC IDs as described herein, as well as routing communications between core network 140 and base station 131 and controlling the operations of base station 131. Wireless access control system 132 may also comprise routers, servers, memory devices, software, processing circuitry, cabling, network communication interfaces, base transceiver stations, base station controllers (BSC), mobile switching centers (MSC), radio node controllers (RNC), or other communication equipment and apparatuses. In some examples, base station 131 and wireless access control system 132 are included in the same equipment or systems.

Wireless access system 130 could include further base stations, base transceiver stations, base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other wireless communication systems, including combinations thereof. Wireless access system 130 may also comprise optical networks, asynchronous transfer mode (ATM) networks, packet networks, metropolitan-area networks (MAN), or other network topologies, equipment, or systems, including combinations thereof. In typical examples, wireless access system 130 includes many base stations and associated equipment for providing communication services to many user devices across a geographic region.

Wireless links 120-121 each use the air or space as the transport media. Wireless links 120-121 may each use various protocols, such as Code Division Multiple Access (CDMA), Evolution-Data Optimized (EV-DO), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), or some other wireless communication format, including combinations, improvements, or variations thereof. Although two wireless links 120-121 are shown in FIG. 1, it should be understood that these separate wireless links are merely illustrative to show two communication sessions or wireless access pathways for each of user devices 110-111. In other examples, a single wireless link could be shown, with portions of the single wireless link shared between user devices 110-111 and used for different communication sessions and associated overhead communications.

Communication links 122-123 each use metal, glass, optical, air, space, or some other material as the transport media. Communication links 122-123 could each use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof.

Links 120-123 may each include many different signals sharing the same link—as represented by the associated lines in FIG. 1—comprising access channels, forward links, reverse links, user communications, communication sessions, overhead communications, frequencies, channels, carriers, timeslots, transportation ports, logical transportation links, network sockets, packets, or communication directions. Communication links 122-123 could each be direct links or may include intermediate networks, systems, or devices. In many examples, the portion of wireless links 120-121 as transmitted by user devices 110-111 is referred to an uplink or reverse link of the wireless link, while the portion as transmitted by wireless access system 130 is referred to as a downlink or forward link of the wireless link.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations

What is claimed is:

1. A method of operating a wireless access system, the method comprising:
in the wireless access system, maintaining an available pool of Media Access Control Identifiers (MAC IDs) for subsequent use by a base station;
in the wireless access system, removing a portion of the MAC IDs from the available pool and using the portion of the MAC IDs for wireless communications between the base station and a plurality of user devices;
in the wireless access system, determining that the available pool of the MAC IDs is insufficient, and in response, selecting a set of the user devices based on at least wireless signal strength; and
in the wireless access system, instructing the selected set of the user devices to not use the base station for the wireless communications and returning ones of the MAC IDs used by the selected set of the user devices to the available pool.

2. The method of claim 1, wherein instructing the selected set of the user devices not to use the base station comprises transferring a data rate control lock from the base station to the selected set of the user devices.

3. The method of claim 2, wherein the data rate control lock indicates no bandwidth is available from the base station for each of the selected set of the user devices.

4. The method of claim 1, wherein selecting the set of the user devices based on at least the wireless signal strength comprises identifying ones of the user devices in a soft hand-off mode with another base station.

5. The method of claim 1, wherein selecting the set of the user devices based on at least the wireless signal strength comprises identifying ones of the user devices in a soft hand-off mode with another base station and having comparable signal strength with the other base station.

6. The method of claim 1, wherein selecting the set of the user devices based on at least the wireless signal strength comprises receiving signal strength indicators from the user devices indicating received signal strength at the user devices.

7. The method of claim 1, wherein the wireless communications between the base station and the plurality of user devices uses the Evolution-Data Optimized (EV-DO) wireless protocol.

8. The method of claim 1, wherein selecting the set of the user devices based on at least the wireless signal strength comprises:
determining an application type of the wireless communications of the user devices, processing the application type of the wireless communications of the user devices and the wireless signal strength to select the set of user devices.

9. The method of claim 8, wherein the wireless communications comprise a forward link portion for communications from the base station to each of the plurality of user devices and a reverse link portion for communications from the plurality of user devices to the base station, and wherein processing the application type of the wireless communications of the user devices comprises determining the set of user devices whose application type only uses the reverse link portion of the wireless communications.

10. A wireless access system, comprising:
a wireless access control system configured to maintain an available pool of Media Access Control Identifiers (MAC IDs) for subsequent use by a base station;
the wireless access control system configured to remove a portion of the MAC IDs from the available pool, and use the portion of the MAC IDs for wireless communications between a wireless transceiver of the base station and a plurality of user devices;
the wireless access control system configured to determine that the available pool of the MAC IDs is insufficient, and in response, select a set of the user devices based on at least wireless signal strength; and
the wireless transceiver of the base station configured to instruct the selected set of the user devices to not use the base station for the wireless communications, and in response, the wireless access control system configured to return ones of the MAC IDs used by the selected set of the user devices to the available pool.

11. The wireless access system of claim 10, wherein the wireless transceiver of the base station is configured to transfer a data rate control lock from the base station to the selected set of the user devices to instruct the selected set of the user devices not to use the base station.

12. The wireless access system of claim 11, wherein the data rate control lock indicates no bandwidth is available from the base station for each of the selected set of the user devices.

13. The wireless access system of claim 10, wherein the wireless access control system is configured to identify ones of the user devices in a soft hand-off mode with another base station to select the set of the user devices based on at least the wireless signal strength.

14. The wireless access system of claim 10, wherein the wireless access control system is configured to identify ones of the user devices in a soft hand-off mode with another base station and having comparable signal strength with the other base station to select the set of the user devices based on at least the wireless signal strength comprises.

15. The wireless access system of claim 10, wherein the wireless transceiver of the base station is configured to receive signal strength indicators from the user devices indicating received signal strength at the user devices.

16. The wireless access system of claim 10, wherein the wireless communications between the wireless transceiver of the base station and the plurality of user devices uses the Evolution-Data Optimized (EV-DO) wireless protocol.

17. The wireless access system of claim 10, wherein the wireless access control system is configured to determine an application type of the wireless communications of the user devices and process the application type of the wireless communications of the user devices and the wireless signal strength to select the set of the user devices based on at least the wireless signal strength.

18. The wireless access system of claim 17, wherein the wireless communications comprise a forward link portion for communications from the base station to each of the plurality of user devices and a reverse link portion for communications from the plurality of user devices to the base station, and wherein the wireless access control system is configured to determine the set of user devices whose application type only uses the reverse link portion of the wireless communications to process the application type of the wireless communications of the user devices.

19. A method of operating a wireless access system, the method comprising:

in the wireless access system, selecting Media Access Control Identifiers (MAC IDs) for subsequent use by a base station, using the selected MAC IDs for a forward link portion of wireless communications between the base station and a plurality of user devices, and restricting the selected MAC IDs from subsequent use by other user devices;

in the wireless access system, determining that an amount of unrestricted MAC IDs is insufficient, and in response, selecting a set of the user devices currently in a soft handoff mode with at least the base station and another base station, transferring a data rate control (DRC) lock instruction to the selected set of the user devices, wherein the DRC lock instruction indicates no bandwidth is available for the forward link portion of the wireless communications between the base station and the selected set of the user devices; and in the wireless access system, releasing ones of the MAC IDs used by the selected set of the user devices for subsequent use by the other user devices.

20. The method of claim 19, wherein selecting the set of the user devices currently in the soft handoff mode comprises:

identifying a portion of the user devices currently in a soft handoff mode and selecting the user devices of the portion which are engaging in application types for the wireless communications which use only a reverse link portion of the wireless communications.

\* \* \* \* \*